Jan. 21, 1958 J. A. BENAROYA ET AL 2,820,667
END AND SIDE LOADING DELIVERY TRUCK BODY
Filed Aug. 14, 1956 5 Sheets-Sheet 1

INVENTOR.
Jack A. Benaroya
Ralph Benaroya

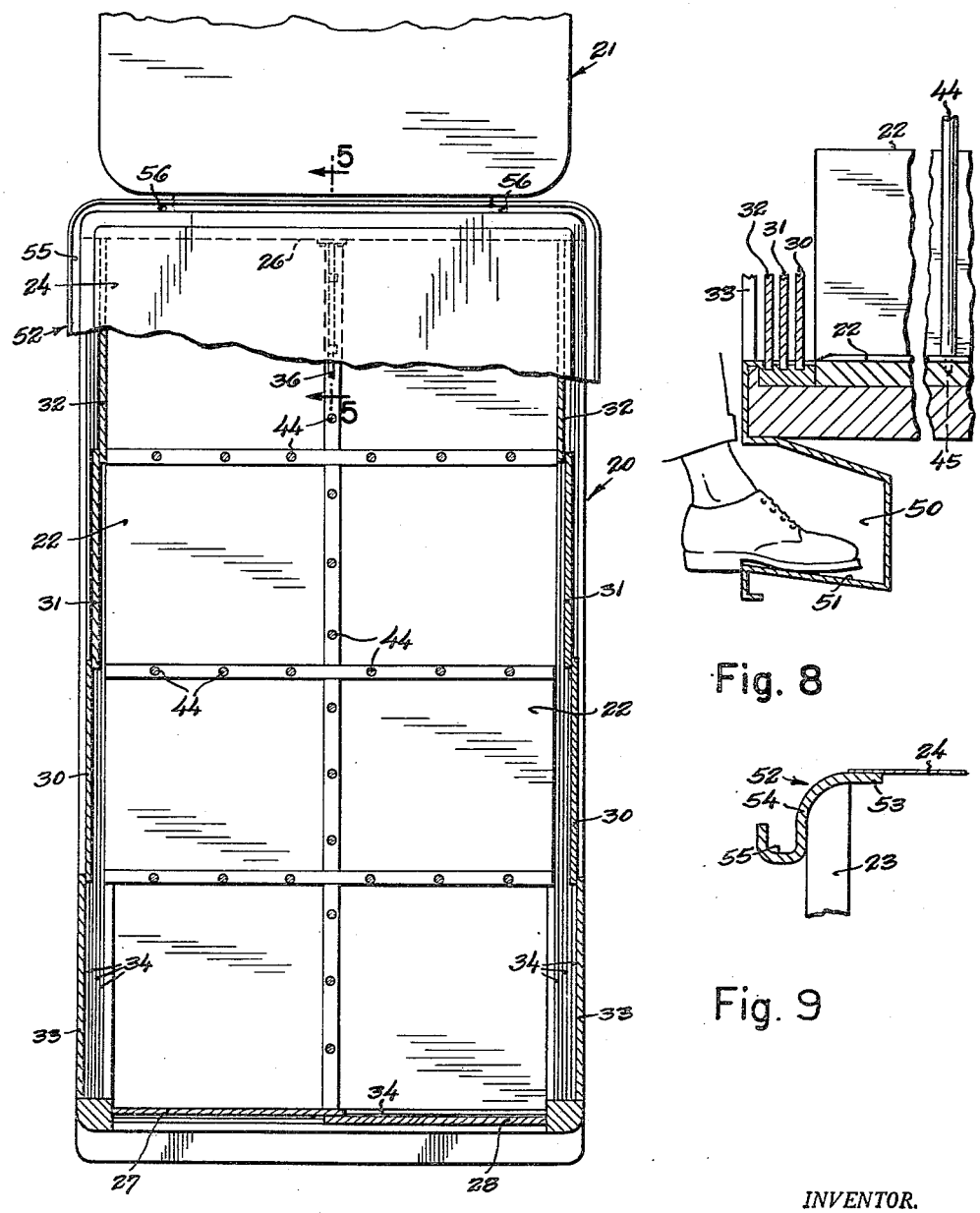

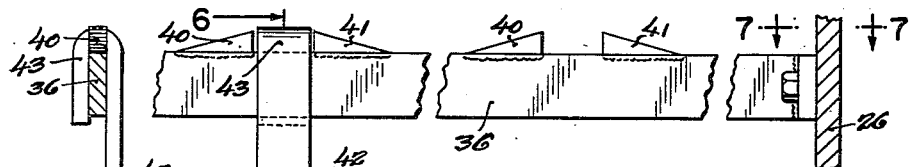
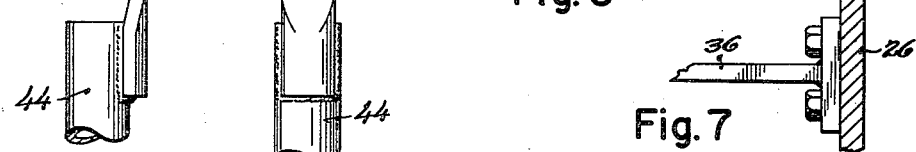
Fig. 5
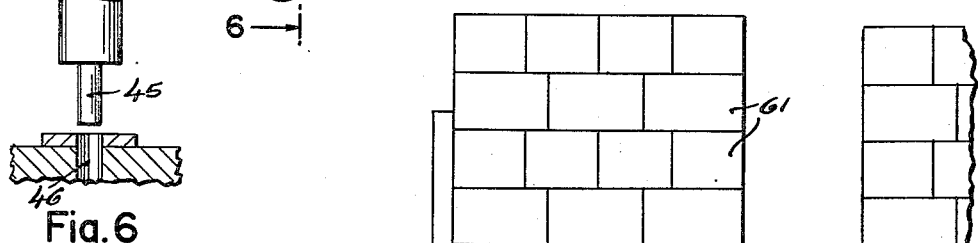
Fig. 7
Fig. 6
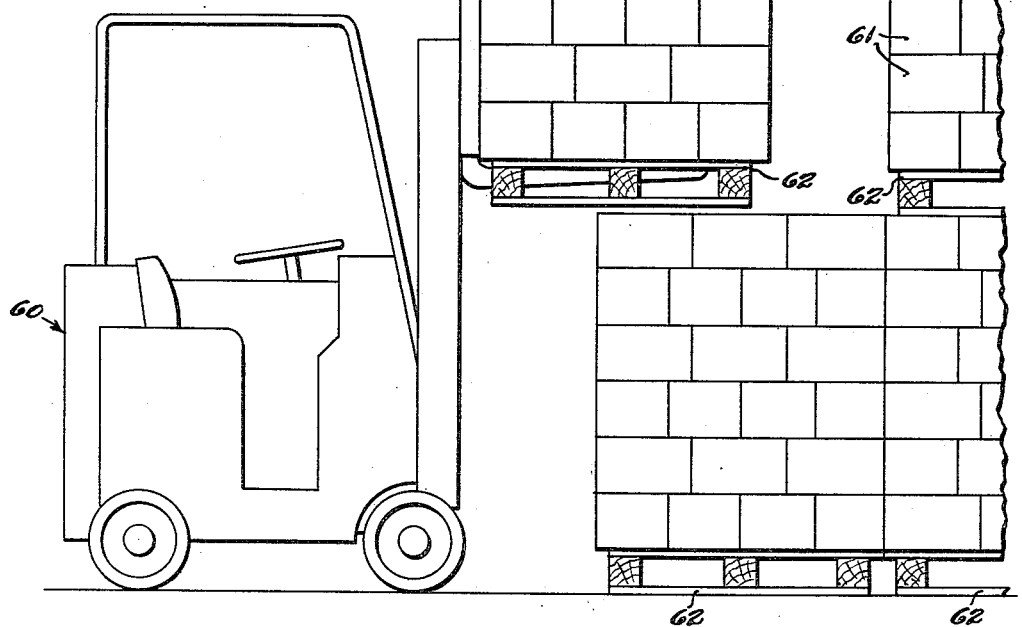
Fig. 11
INVENTOR.
Jack A. Benaroya
Ralph Benaroya Jan. 21, 1958   J. A. BENAROYA ET AL   2,820,667
END AND SIDE LOADING DELIVERY TRUCK BODY
Filed Aug. 14, 1956   5 Sheets-Sheet 4
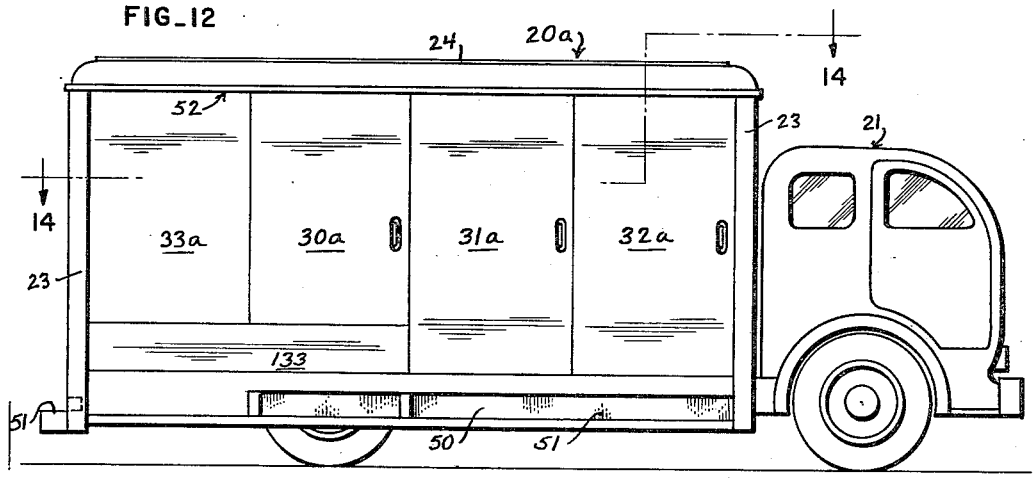
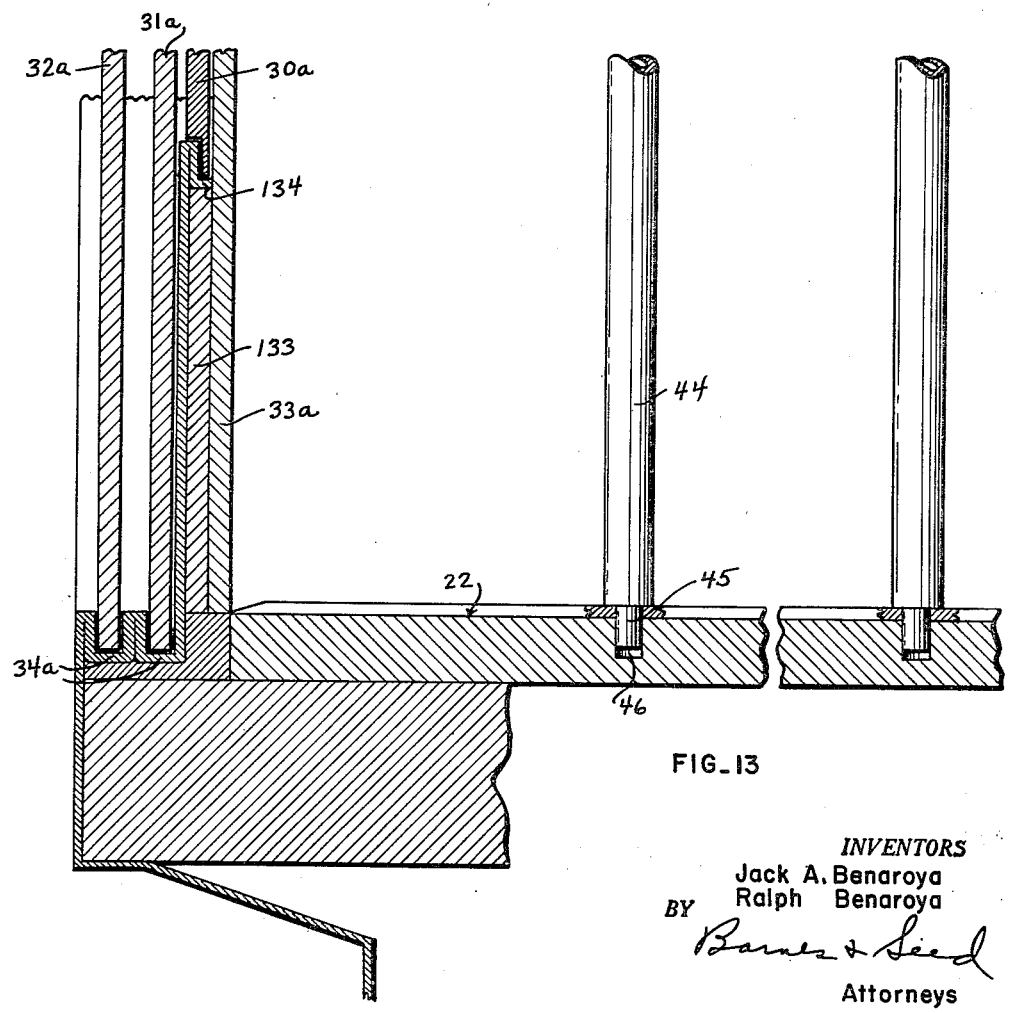
INVENTORS
Jack A. Benaroya
BY   Ralph Benaroya
Attorneys Jan. 21, 1958 J. A. BENAROYA ET AL 2,820,667
END AND SIDE LOADING DELIVERY TRUCK BODY
Filed Aug. 14, 1956 5 Sheets-Sheet 5
FIG_14
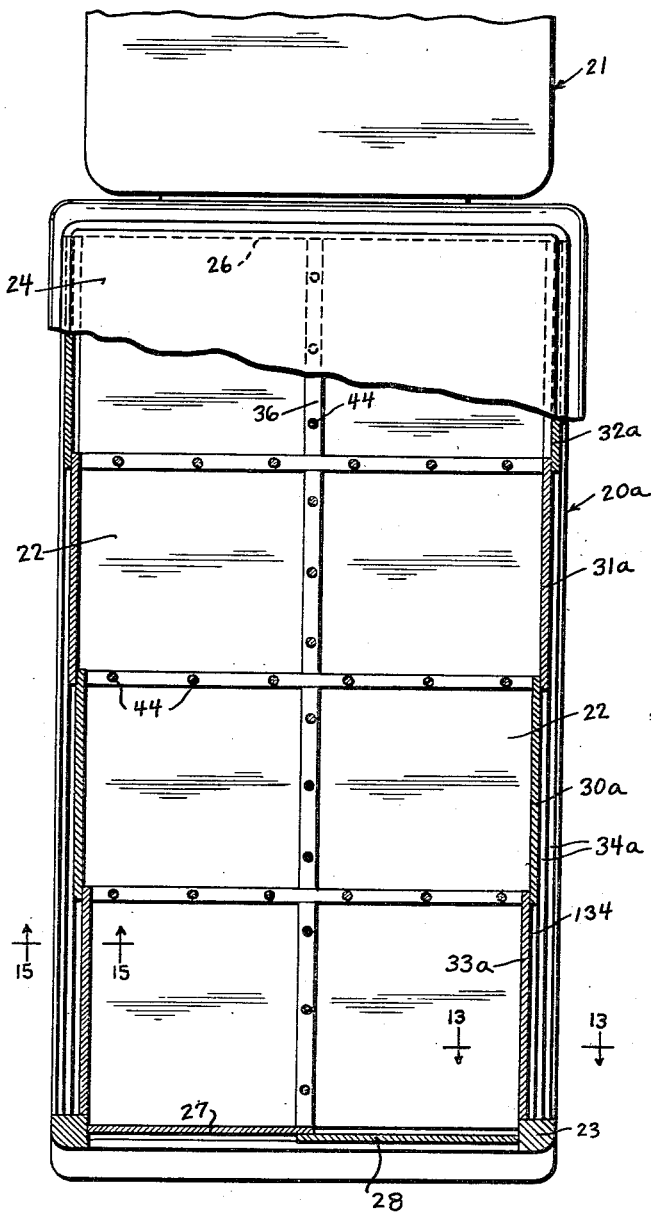
FIG_15
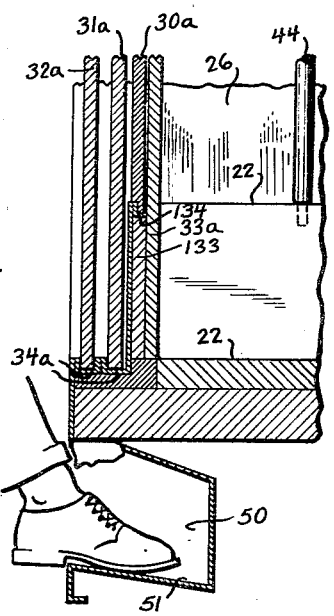
INVENTORS
Jack A. Benaroya
Ralph Benaroya
BY
Barnes & Seed
Attorneys United States Patent Office 2,820,667
Patented Jan. 21, 1958

2,820,667

END AND SIDE LOADING DELIVERY TRUCK BODY

Jack A. Benaroya and Ralph Benaroya, Seattle, Wash.

Application August 14, 1956, Serial No. 603,989

2 Claims. (Cl. 296—24)

This invention relates to load-carrying bodies, particularly bodies for delivery trucks where the body is loaded with packaged goods which are to be delivered at separated points along the course of a delivery route. The present application is a continuation-in-part of our copending application, Ser. No. 242,704, filed August 20, 1951, and now abandoned.

For its principal object the invention aims to provide a delivery body which admits of being loaded with a minimum of effort and in a fraction of the time required with the conventional type of delivery body, and which may be unloaded with similar ease and expedition where, as may be the case, a driver returns to the loading yard with packages picked up along the route or is called upon to carry to a warehouse a load which is to be stored therein.

The invention has the further and important object of providing a body for delivery trucks which is divided into a plurality of separated load-receiving compartments, and in which all of these compartments are directly accessible to the driver of the truck from positions outside the body, thus expediting deliveries by obviating any need for the driver to climb into the body of the truck in order to obtain a package which is to be delivered.

As a further object still, the invention purposes to provide a truck body in which the compartmenting separators admit of being opened and closed, or bodily removed, at will so as to bring one or more adjoining compartments into communication, either to obtain temporary access through one to another of such compartments, as may on occasion be desirable, or to provide, where the demands of a particular load-carrying operation require the same, a loading space larger than that which the floor area of the normally separated compartments individually afford.

It is a yet further and important object to device a delivery truck body which serves in consequence of its compartmenting feature to maintain a proper distribution of the load weight by preventing a shifting of the load while the truck is under way.

With these and other objects and advantages in view, and which will each appear and be understood in the course of the following description and claims, the invention consists in the new method of yard-loading and in the novel construction, adaptation and combination of parts of a delivery truck body to which said method peculiarly adapts itself.

In the accompanying drawings:

Fig. 3 is a view partly in top plan and partly in horizontal section, the section line being shown at 3—3 of Fig. 1.

Fig. 5 is a fragmentary longitudinal vertical section drawn to an enlarged scale on line 5—5 of Fig. 3.

Fig. 6 is a fragmentary transverse vertical section on line 6—6 of Fig. 5.

Fig. 7 is a fragmentary horizontal section on line 7—7 of Fig. 5.

Fig. 8 is a fragmentary transverse vertical section on line 8—8 of Fig. 1 with the employed scale being larger than that of Fig. 1 but reduced from the scale employed in Figs. 4 through 7, inclusive.

Fig. 9 is a fragmentary transverse vertical section on line 9—9 of Fig. 1 and employing the same scale as that of Fig. 8.

Figure 10:
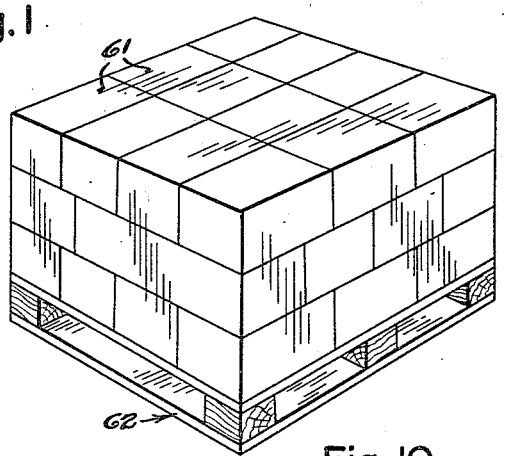
Figure 4:
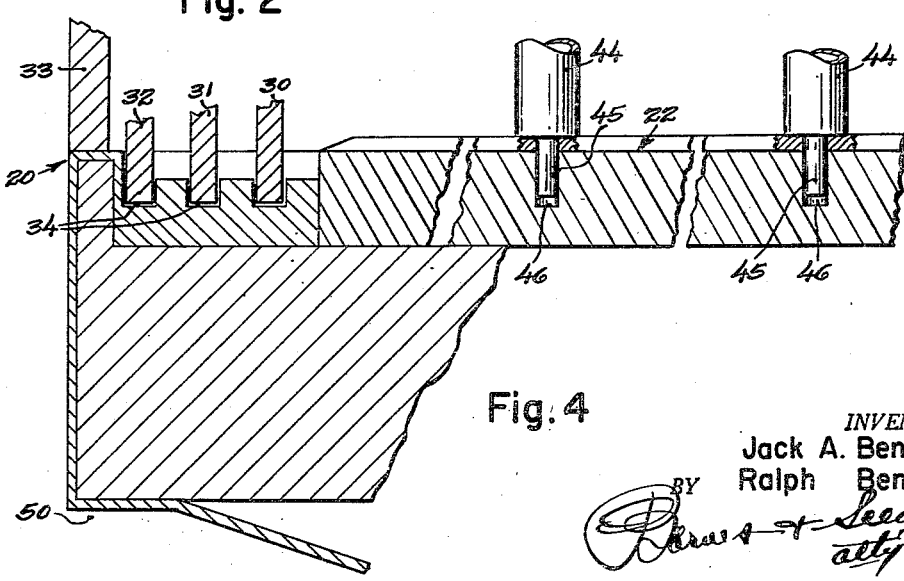
Fig. 4 is a fragmentary transverse vertical section drawn to an enlarged scale on line 4—4 of Fig. 1.

Fig. 10 is a perspective view illustrating a batch load of the type which the several compartments of the truck body are primarily designed to handle; and Fig. 11 is a view in side elevation illustrating one step in the new load-handling method to which our truck body adapts itself, and namely the step of picking up, preparatory to transferring the same to the truck body, one of a plurality of pallets stacked in tiers within a warehouse and having sustained thereon a batch of packages contained within a compass determined by the size of the individual compartments of the truck.

Fig. 12 is a side elevational view of a modified body having the same interior arrangement and same rear closure as that afore-illustrated, the modification residing in the arrangement of the side doors.

Figure 1:
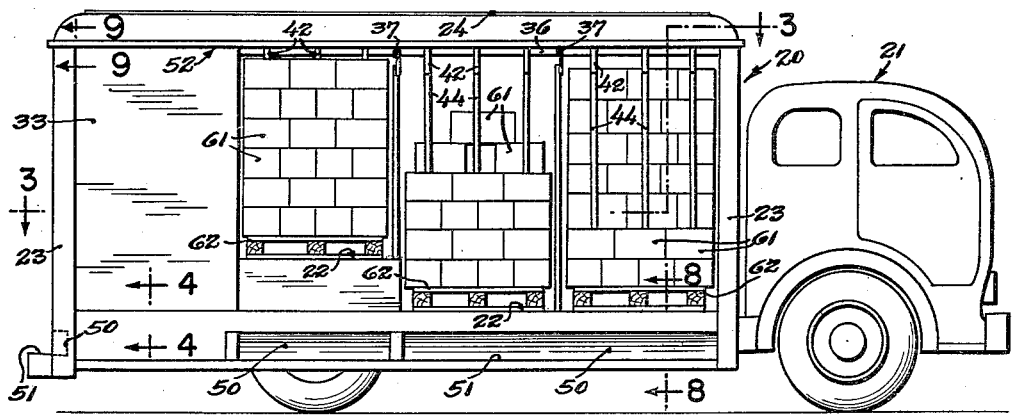
Figure 1 is a side elevational view portraying a delivery truck body constructed in accordance with the preferred teachings of the present invention, the body being here shown in a loaded condition and with the sliding doors along the right side of the body being opened to expose three of the eight compartments which the illustrated embodiment provides.
Figure 2:
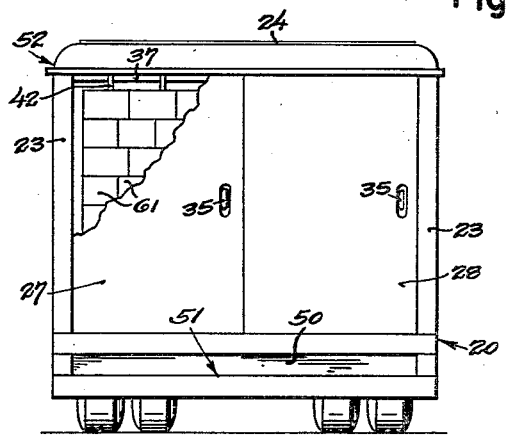
Fig. 2 is a rear-end elevation with the sliding doors closed and with one of such doors partially broken away.

Fig. 13 is a fragmentary transverse vertical sectional view to an enlarged scale taken along the line 13—13 of Fig. 14, but with all of the side doors moved to the rear to a fully open position corresponding to that shown in Fig. 1.

Fig. 14 is a horizontal sectional view taken as indicated by the line 14—14 of Fig. 12.

Fig. 15 is a fragmentary transverse vertical sectional view to an enlarged scale taken along the line 15—15 of Fig. 14 with the side doors being open as in the case of Fig. 13.

The delivery body to which the present invention pertains may be constructed, self-evidently, either upon the chassis of a self-propelled truck or it may be built upon the chassis of a trailer. The former such usage is shown in the drawings with the body being denoted generally by the numeral 20 and the operator's cab of the associated truck by 21. The manner in which the body is integrated with the vehicle frame is unimportant and suffice it to say that the body is suitably bedded upon the frame. The loading space provided within the body is defined at the bottom by a floor, at the top by a roof, and at the sides and ends by fixed and movable panels, all of which will be hereinafter particularly described.

Considered in longitudinal vertical section, the floor 22 has a jogged profile configuration presenting three decks, two of which occupy a common level below the level of the third deck and lie one to the front and the other to the rear of such raised deck. The raised deck is called for in order that clearance may be given for the rear wheels of the truck. The load capacity and weight distribution engineered into the truck will serve in large measure to prescribe the comparative floor areas as between the three decks but as here shown, and which is eminently suited to our purpose, the rear lower-level deck and the raised deck have more or less the same area while the front lower-level deck has an area approximating the combined areas of the other two decks.

The body has vertical posts 23 at each of the four corners and surmounting these posts is the roof for the body. The roof proper is composed of a plate 24 marginally stiffened in a manner hereinafter to be described, and desirably is reinforced on the underside by conventional fret-work slats (not shown).

As respects the sides and ends of the body, the same is permanently closed at the front by a fixed panel 26, is closed at the rear by a pair of lapped sliding doors 27 and 28, and at each of the two sides is closed in part by a set of lapped sliding doors, indicated as being three in number and designated 30, 31 and 32, and in part by a fixed panel 33. These fixed side panels 33 extend forwardly from a respective rear post 23 to approximately the rear-end limit of the raised deck and, with the fixed front panel 26, serve as complements of the post to give rigidity to the body. The several doors are each guided in their slide movement by a track at the top and a slideway at the bottom. Only the slide-ways, which are comprised of floor channels 34, are shown in the drawings, and insofar as the top tracks and bottom channels for the rear doors are concerned the same run one alongside the other from the rear post at one side to the rear post at the other side of the body's rear opening. The track and channel guide-ways for the side doors 30, 31 and 32 each lie to the inside of the fixed side panel 33 so as to permit the doors to be recessed behind the latter when they are moved to open positions, and these guide-ways can each extend the full length of the body or they may, if desired, be of progressively greater length, and namely such that one set of the track and channel guide-ways extends forwardly from the rear post to approximately the mid-length of the front low-level deck, and the remaining third set extends the full length of the body, or which is to say from the corner post at the rear to the corner post at the front. The doors, as stated, lap one another in their closed positions, and by such token the two rear doors perforce have a width greater than one-half the full width of the rear opening and each of the three side doors has a width greater than one-third the full span of the body's side opening. The lap is, however, very slight. For locking the doors in their closed positions there are provided the usual bolts (not shown) operable by control handles 35 and complemented, at the top and bottom of the doors, by mating sockets placed so as to register with the bolts when the doors are closed.

Proceeding now to a description of the compartmenting feature of our invention, there is rigidly supported within the body a horizontal rack fabricated from rail-like stringers and positioned immediately below the ceiling. One of these stringers, denoted by 36, extends the full length of the body on the approximate longitudinal median line thereof and may be considered as a trunk stringer in that the same is augmented by a plurality of articulating branch stringers 37 which extend transversely to the side edges of the body. There are three of these branch stringers at each side of the trunk stringer and the same are spaced equidistantly one from another and from the end limits of the body, thus positioning the branch stringers such that they lie in vertical planes defined by perpendiculars raised one from the rear edge of the raised deck, one from the front edge of the raised deck, and one from the transverse median line of the front low-level deck. As will be seen from an inspection of Figs. 5 and 6, the stringers have surmounting pairs of spaced ears, as 40 and 41, welded thereon at spaced intervals of the length, and arranged to be seated in the saddle notches which these ears provide are respective hangers 42. The hangers are or may be composed of strap iron bent to provide a U-shaped terminal hook 43, and are each securely attached, as by welding, to the head end of a respective one of a plurality of tubular bars 44, and upon the lower ends of these bars there is provided a pin prolongation 45 which is caused to be lodged in a mating foot-socket 46 set into the floor of the body. As will, it is believed, be clearly understood, there is a saddle notch and a foot-socket for each of the several bars, with each foot-socket being vertically aligned with the related notch.

The desirable arrangement is one in which three saddle notches are spaced equidistantly one from another and from the end limits of each of the several branch stringers 37, and one from another and from the end limits of each of those sections of the trunk stringer which are set apart by the articulation of the branches with the trunk. The act of hooking a hanger, with its pendant bar, in each of these notches and coincidently lodging the pin of the concerned bar in the related foot-socket 46 operates to divide the interior of the body into a plurality of separated compartments. In our illustrated lay-out such compartments, or cages as they will be hereinafter termed, are eight in number, four occurring at one side and four occurring at the other side of the body's longitudinal median line. The two rearmost cages are accessible in normal usage only from the rear end of the truck through the rear openings closed by the sliding doors 27 and 28. Similarly, the three cages at each side of the body which lie to the front of these rear cages are accessible in normal usage only from a related side opening of the truck and are closed by the side doors 30, 31 or 32, as the case may be. This isolation of one from another such cage applies, however, only to ordinary usage, and where it becomes desirable to bring any two or more cages into communication this can be easily and quickly accomplished simply by lifting the bars and sliding the same to an end limit of the stringer from which the bars are hung; or, if it be desired to remove the bars from the body, this also can be expeditiously accomplished in that the terminal hooks 43 can be lifted in a degree sufficient to completely free the same from the stringers.

From the foregoing it will be seen that we have provided a compartmented truck body characterized in that each of the defined compartments is accessible from a position outside the body and thus permits a driver operating the truck to place objects in or remove objects from any of the several compartments without being required to climb into the body. Below each of the several access openings there is provided a recessed pocket 50 defining a ledge 51 on which the driver is enabled to stand when reaching for an object lying at the top of a load-stack, and in order to promote stability when standing on such ledge the latter is sloped inwardly as shown in Fig. 8. A further refinement embodied in the present truck body is the provision of a rain trough 52 skirting the roof throughout the entire perimeter of the latter. The trough gives protection against rain dripping off the roof and is a practical necessity where, as is ordinarily the case, the handling of the load is done from a position alongside or to the rear of the body directly under an edge of the roof. In addition to its rain-collecting office, the trough serves the afore-mentioned function of marginally stiffening the roof plate 24. The trough is stamped from fairly heavy-gauge sheet metal to a shape which is generally angular in transverse vertical section, with one flange 53 of the angle-forming L being welded to the roof plate as an underlying adjunct thereof and having the other flange 54 directed downwardly and curled upwardly along the free edge to produce a gutter-forming lip 55 (see Fig. 9). Collected rain escapes through holes 56 provided at the front along that section of the trough which overhangs the fixed panel 26, and these holes may, if desired, be augmented by down-spouts (not shown).

The described truck body peculiarly lends itself to a load-handling technique similar, in some respects, to that which is employed in stowing cargo within the hold of a vessel, and namely one in which batch loads are carried upon a pallet and the pallet, with its batch load intact, carried by a fork-lift truck to a ship-side point. In ship-cargo practice, the loaded pallet is moved from ship-side into the hold by a loading crane and the batch load is there removed and stowed by hand. In our system of load-handling, pallets are employed and a multiplicity of these pallets, each carrying thereon a batch load composed of a stock of packaged goods which are to be delivered, package by package, along a delivery route, are pre-loaded and stored in a warehouse. As delivery trucks constructed to embody our present teachings enter a loading yard adjacent to the warehouse the work of loading the truck or of discharging a load which has been brought into the yard is performed entirely by a fork-lift truck. The employed pallets have a width and depth somewhat smaller than the width and length of the separated compartments of the delivery body, and the pre-loaded batch loads are of a height determined by the load-ceiling limit of the compartments. Within the warehouse the pre-loaded pallets are or may be stacked in tiers limited in the overall height only by the vertical reach of the employed fork-lift truck. Let it be assumed that the goods to be delivered are cartons of beer. In the pre-loading of the pallets the cartons on a single pallet will all be alike but some pallets will be loaded with cans, others with pint-sized bottles, and still others with jumbo bottles. A delivery truck returning from its route will perforce be carrying cartons of empty bottles picked up along the route, and in a manner which will become apparent, the cartons of empties contained in each of the compartments of the delivery truck rest upon a pallet. The operator of the fork-lift truck loads and un-loads the compartments in turn, first running the forks under a pallet of empties, raising the forks in the degree necessary to clear the floor of the compartment, and then backing off the fork-lift truck and moving into the warehouse to deposit the empties in an area provided therefor. He then moves to one of the tiers of pre-loaded pallets, picks up the top pallet of the stack, and again returns to the loading yard where the fork-carried pallet is introduced into the compartment of the delivery truck from which the pallet of empties was drawn. The operation of removing the pallets of empties successively from the compartments and re-loading the same with the pre-loaded pallets of filled cartons can be completed in a matter of moments. The desirable practice, where loads such as beer are being handled or, in fact, any load the delivery of which also involves picking up articles or packages along the course of the route, is to introduce to the delivery truck's compartmented interior less than a full load, and which is to say load only six, say, of the eight compartments and leave two of the compartments as spares for the reception of empties picked up along the early part of the route. However, a non-loaded pallet is placed upon the floor of each of such spare compartments to receive the pick-up empties placed therein. As these spare compartments become filled with empties another of the compartments from which the driver has been filling his orders will have become emptied of its load and it thus follows that space for the reception of the pick-ups is available at all times in a compartment unoccupied by any parcel which is to be delivered. Beer deliveries dictate that two of the compartments be left as spares by reason of the two sizes in which bottled beer is sold.

The separating bars which define the side and rear limits of a cage can perforce be bodily removed or shifted longitudinally of the related stringer whenever a call arises for a larger loading space than is afforded by a single cage. This ability to shift the bars so as to give access through the back of an empty or partially empty right-hand cage to a loaded cage located at the left side of the body also is at times advantageous from the standpoint of the driver's safety in that the driver is not, in such case, required to expose himself to a lane of heavy traffic when the truck is parked in a heavily congested street. The ability to bodily remove and replace the bars easily and expeditiously makes the body a double-purpose unit. Again using beer deliveries as an example, a call may arise either for the rush delivery of several kegs of draft beer at a time when all of the regular draft-beer trucks of the fleet are out of the loading yard, or it may be that there is, on occasion, an unusually heavy call for draft beer beyond the capacity of the regular keg-handling trucks to handle. In the former instance, two or more cages can be joined as one and used to receive kegs of beer, while still retaining other of the cages for loads of canned or bottle beer. In the latter instance the entire loading chamber can be converted into a single unobstructed box by removing and storing the complete complement of separating bars.

A modified sliding side door arrangement for our delivery truck body is illustrated in Figs. 12–15 and in these figures modified parts to those afore-described have been identified by the same numerals followed by the suffix "a" and identical parts have been given the same numerical designations. Referring to Fig. 12, it is seen that the rear stationary side panels 33a are overlapped at their lower end portions by elongated panels 133 which also cover the outer ends of the raised portion of the deck 22 which overlies the rear wheels of the truck. Along their upper side edges these panels 133 present tracks 134 for shortened sliding side doors 30a which lap the panels 33a. Each door 30a is lapped by an intermediate sliding door 31a which is in turn lapped by a forward sliding door 32a. These doors 31a, 32a slide the full length of the body on tracks 34a which lie outwardly of panel 133 and track 134. Thus sliding doors 30a, 31a, and 32a can all be moved to the rear to overlie panel 33a and thereby expose all of the interior compartments other than the two at the extreme rear to which access can be had directly by the rear doors 27, 28.

Changes in the details of construction of the delivery truck body can self-evidently be made without departing from the spirit of the invention and it is therefore our intention that no limitations be implied and that the hereto annexed claims be given a scope in their interpretation commensurate with the broadest meaning to which the employed language fairly admits.

What we claim, is:

1. In a delivery truck body having a load-sustaining floor of generally rectangular plan configuration, a roof for said floor, and having wall-forming panels extending along the entire front and along such a rear portion of each side as comprehends approximately one-fourth of the over-all length of the floor, leaving the back of the body entirely open and also having the sides open between said side panels and the front-end limit of the interior loading space, a rack supported in the ceiling portion of said loading space immediately below the roof and composed of articulating trunk and branch stringers of which the trunk stringer extends horizontally along the longitudinal median line of the body and of which the branch stringers extend transversely therefrom at quadrisecting intervals of the body's length, a plurality of vertical bars hung from each of said branch stringers and from each of the sections of the trunk stringer set apart by the articulation with the branch stringers and each finding a footing engagement with the floor of the body, said bars serving to divide the interior of the body into eight cages of approximately equal floor area arranged in rows of four, one row at one side and the other row at the other side of the longitudinal median line of the body, the rear cage in each row being exposed for direct access through said back opening of the body and the other three cages in each row being exposed for direct access through a related said side opening of the body, rear closure means mounted at the back of the body for closing said back opening and movable to provide access therethrough, and doors at each side of the body slidably mounted for movement into and out of positions closing the said related side openings.

2. In a delivery truck body providing an interior loading space defined at the bottom by a floor and at the top by a roof, articulating trunk and branch stringers supported in the ceiling portion of said loading space with the trunk stringer extending along the longitudinal median line of the loading space and the branch stringers extending laterally from the trunk stringer toward the side limits of the loading space in parallel spaced relation to one another, each of said branch stringers and each of the sections of said trunk stringer set apart by the articulation with the branch stringers having a respective plurality of depressed seats spaced along its length, and a plurality of vertical bars socketed at the bottom with said floor and having respective hooks at the top engaging said seats whereby each of said bars can be selectively raised to remove its hook from the related seat and free its bottom end from the floor such that the bar can then be shifted along the respective stringer, said bars dividing the loading space into two rows of cages, one row at one side and the other row at the other side of the longitudinal median line occupied by said trunk stringer, there being provided an outside opening in the body for each cage, and multiple closure means movably mounted on the body for selective movemet into and out of positions closing said openings, the aforesaid shiftability of said bars along their related stringers providing selective access between adjoining cages.

References Cited in the file of this patent

UNITED STATES PATENTS

| | | |
|---|---|---|
| 1,050,699 | Schmitt | Jan. 14, 1913 |
| 1,341,744 | Hatch | June 1, 1920 |

FOREIGN PATENTS

| | | |
|---|---|---|
| 595,829 | France | July 25, 1925 |

OTHER REFERENCES

"Bottlers' Body," Article in "Commercial Car Journal," vol. LXXX, No. 4, of December 1950; pages 62, 64 and 114.